(12) United States Patent
Mulyono

(10) Patent No.: US 11,708,492 B2
(45) Date of Patent: Jul. 25, 2023

(54) BIODEGRADABLE AND EDIBLE BIOPLASTIC FROM RENEWABLE PLANT BASED POLYMER FOR PACKAGING AND THE MANUFACTURING METHOD THEREOF

(71) Applicant: Noryawati Mulyono, Jakarta (ID)

(72) Inventor: Noryawati Mulyono, Jakarta (ID)

( * ) Notice: Subject to any disclaimer, the term of this patent is extended or adjusted under 35 U.S.C. 154(b) by 0 days.

(21) Appl. No.: 17/628,197

(22) PCT Filed: Jul. 24, 2020

(86) PCT No.: PCT/ID2020/000004
§ 371 (c)(1),
(2) Date: Jan. 18, 2022

(87) PCT Pub. No.: WO2021/019525
PCT Pub. Date: Feb. 4, 2021

(65) Prior Publication Data
US 2022/0251390 A1    Aug. 11, 2022

(30) Foreign Application Priority Data
Jul. 24, 2019  (ID) .............................. P00201906541

(51) Int. Cl.
| | | |
|---|---|---|
| *C08L 99/00* | (2006.01) | |
| *B29C 39/00* | (2006.01) | |
| *B29C 39/02* | (2006.01) | |
| *B29C 39/36* | (2006.01) | |
| *B29C 39/38* | (2006.01) | |
| *B65D 65/46* | (2006.01) | |
| *B29K 96/00* | (2006.01) | |
| *B29K 105/00* | (2006.01) | |

(52) U.S. Cl.
CPC ............ *C08L 99/00* (2013.01); *B29C 39/003* (2013.01); *B29C 39/02* (2013.01); *B29C 39/36* (2013.01); *B29C 39/38* (2013.01); *B65D 65/46* (2013.01); *B29K 2096/00* (2013.01); *B29K 2105/0088* (2013.01); *C08L 2201/06* (2013.01)

(58) Field of Classification Search
CPC ..... C08L 99/00; C08L 2201/06; B65D 65/46; B29C 39/003; B29C 39/36; B29C 39/02; B29C 39/38; B29K 2105/0088
USPC ............................................................ 524/9
See application file for complete search history.

(56) References Cited

U.S. PATENT DOCUMENTS

2020/0214484 A1*  7/2020  Briganti ............... A21D 13/062

* cited by examiner

*Primary Examiner* — Hui H Chin

(57) ABSTRACT

This invention relates to the flexible packaging, either as sheet, roll, bag, sachet, or other forms, which is biodegradable and edible, and could be used as packaging for solid, semisolid, and liquid, which is featured by the composition of biopolymers, at least two of different natural and renewable biopolymers, and the manufacturing method thereof.

2 Claims, No Drawings

BIODEGRADABLE AND EDIBLE BIOPLASTIC FROM RENEWABLE PLANT BASED POLYMER FOR PACKAGING AND THE MANUFACTURING METHOD THEREOF

FIELD OF THE INVENTION

This invention relates to biodegradable and edible bioplastic from renewable plant based polymer for packaging and the manufacturing method thereof, and the method of forming bioplastic into certain form, such as sheet, roll, bag, sachet, and the like.

BACKGROUND OF THE INVENTION

This invention has been known and used to substitute plastic-laminated paper which is used for wrapping burger, rice, and the like, or composite packaging containing aluminum used as sachet for coffee, cereal, and the like, or sheet for wrapping sanitary napkin, soap, toothpick, straw, and the like. The technology invention about edible bioplastic is disclosed in previous patent (IDP000044135 B at Nov. 12, 2012 entitled The Process of Manufacturing Edible Bioplastic from Seaweed), wherein the raw material is the whole seaweed so that it shortens the process and saves the production cost. However, this invention still has some weaknesses, such as the resulted bioplastic could not be used as packaging for liquid or semisolid products. Other invention (IDP000038531 B at Aug. 19, 2011 entitled The Process of Manufacturing Biodegradable Bioplastic from Forest Plant) discloses the process of making biodegradable bioplastic from dammar resin, copal, and jelutung, and its biodegradation using pure culture or consorsium microbes. The bioplastic in that invention is made as sheet or coating to a certain matrix. However, that invention still has some weaknesses, such as need separation by organic solvent or melting, so it is high cost.

This invention is intended to overcome those problems by combining at least two renewable and natural biopolymers, which can synergistically interact, including but not limited to polysaccharides from seaweed, potato, cassava, sweet potato, rice, corn, glutinous rice, chitin, chitosan, dammar resin, rubber, copal, jelutung, soy protein and gluten.

BRIEF SUMMARY

The main objectives of this invention are to provide the biodegradable and edible bioplastic from renewable natural polymer for packaging, and the manufacturing method thereof, from which the resulted packaging are as sheet, roll, bag, sachet, which are flexible, figured out by containing at least two renewable and natural biopolymers, which can be used as packaging for solid, semisolid, and liquid.

The objective of this invention is to provide biodegradable and edible for packaging from natural and renewable polymer, which comprises of Seaweed from genus *Eucheuma, Sargassum, Turbinaria,* or *Gracilaria* as much as 10-60% w/w,
Tubers from potato, cassava, and sweet potato as much as 0-15% w/w,
Protein isolate from soy and gluten as much as 0-20% w/w,
Tree resin from rubber, copal, dammar, and jelutung as much as 0-5% w/w, and
Additive from glycerine, sorbitol, PEG, flavor, and food color as much as 1-20% w/w, figured out by the bioplastic with thickness is 0.07-0.24 mm and flexible.

The aim of this invention to produce bioplastic could be achieved by providing the method of making biodegradable and edible for packaging from natural and renewable polymer comprising steps as follows:

Mixing seaweed 10-60% w/w, tubers 0-15% w/w, protein isolate 0-20% w/w, tree resin 0-5% w/w, and additive 1-20% w/w to form colloid;
Homogenizing the colloid with or without water to produce bioplastic;
Heating the bioplastic at 60-130 deg. C. to decrease the water content to 11-13%;
Casting bioplastic in a mold and further drying
Releasing the bioplastic from its mold to obtain the product as desired.

DETAILED DESCRIPTION

This invention is a environmentally friendly packaging from natural and renewable polymers, as sheet, roll, bag, sachet, which is flexible, and could be used as packaging for solid, semisolid and liquid products. If used as food packaging, this packaging is also edible. As raw material, minimum two different natural and renewable biopolymers are used, and those biopolymers could synergistically interact to produce the bioplastic with better characteristics than those as single polymers. The intended characteristics in this invention are water resistance, flexibility, sealing strength, convenience during handling and disposal, and degradation rate in its disposal. The resulted bioplastic of this invention could be used as packaging for a definitive product, such as soap bar, spoon, toothpick, straw, bread, burger, rice, grains or powder, such as cereal, coffee, and semisolid product, such as soy sauce, or liquid product such as frying oil and seasoning oil.

The bioplastic sheet from this invention is rollable. Then, it could be unrolled to get the long sheet with certain width and ready for further process to produce straw. The straw can be consumed along with the drinks and does not alter the taste of the drinks.

The other goal of this invention is to disclose the composition of bioplastic resin which can be further formed into biodegradable and edible sheet. The bioplastic resin can be produced by mixing at least two different natural and renewable polymers at certain ratio to produce a homogenous mixture, and drying it using a particular drying technique, such as but not limited to spray drying, deck-oven, freeze drying, or vacuum drying. The bioplastic resin in this invention is just need to be dissolved in water, casted, and dried to produce bioplastic sheet.

The bioplastic produced in this invention could be naturally degraded by pure culture or consortium microbes to become biomass which could be used as fertilizer or soil. Some examples below describe this invention, but they are not intended to limit this invention.

Example 1: Producing Biodegradable Bioplastic from Seaweed for Soap Wrap

As much as 60 g of *Eucheuma* sp seaweed is soaked in 3 L of water for 10 min-24 h, then it is rinsed with clean water, drained, and chopped with water to obtain colloid with the viscosity 800-3000 cps. In separate container, 15 g of potato is washed, mashed, and mixer with 5 g of soy protein isolate until homogenous, then it is slowly added to the seaweed colloid, and stirred until homogenous. This colloid is casted, dried, and released from the mold. The resulted bioplastic will be 0.07-0.24 mm thick. Other composition for biodegradable or edible bioplastic disclosed in this invention could be seen in Table 1.

TABLE 1

The composition of bioplastic (dry base)

| Raw material | | Biodegradable | | | | Edible | | |
|---|---|---|---|---|---|---|---|---|
| | | 1 | 2 | 3 | 4 | 5 | 6 | 7 |
| Seaweed | Eucheuma sp | 60 | | 60 | | | 60 | |
| | Gracilaria | | | | | 55 | | 30 |
| | Turbinaria | | | | | | 10 | 35 |
| | Sargassum | | 40 | | | | | |
| Tubers | Potato | 15 | | | | | | |
| | Cassava | | 15 | | 25 | | | |
| | Sweet potato | | | | | | 5 | |
| Grains | Corn | | 15 | | | | 2.5 | |
| | Glutinous rice | | | | | | | 3 |
| | Rice | | | | | | | |
| Crustaceae | Chitin | | | 2.5 | | | | |
| | Chitosan | | | | 2.5 | | | |
| Protein | Soy | 5 | | | | | | |
| | Gluten | | | | | 7.5 | | 20 |
| Resin/sap | Rubber | 5 | 2.5 | | | | | |
| | Copal | | 2.5 | | | | | |
| | Dammar | | 5 | | | | | |
| | Jelutung | | | | | | | |
| Additives | Glycerin | 15 | 15 | 15 | 15 | | 1.5 | 10 |
| | Sorbitol | | 5 | | | 12.5 | 20 | |
| | PEG | | | | | | | |
| | Flavor | | | | | | | 1 |
| | Color | | | | | | 1 | 1 |

Example 2: Producing Biodegradable Bioplastic from Seaweed as Accessories Packaging As much as 40 g of *Sargassum* sp seaweed is washed with water, then extracted in 1 L of water with adjusted pH to 8.5-9.5 using sodium bicarbonate, to obtain homogenous colloid. In the second container, 15 g of cassava starch is mixed with 15 g of corn starch, water, and cooked to obtain gelatinous starch. In the third container, 2.5 g of copal and 5 g of dammar are dissolved in 15 g of glycerin. Then, 2.5 of melt rubber is added to the third container and stirred until homogenous. Then, all mixture in the second and third containers are stepwisely added to the first container with stirring to obtain a homogenous final mixture. The mixture is casted, dried, and released from the mold. The resulted bioplastic will be 0.07-0.24 mm thick.

Example 3: Producing Edible Bioplastic from Seaweed for Margarine Sachet

As much as 55 g of dry *Gracilaria* seaweed is washed by clean water and cleansed from foreign matter, including the attached rock, then extracted in 1.1 L of water under pH 8-9 using sodium bicarbonate. After the extraction process finished, 25 g of cassava starch and 7.5 g of gluten are added and stirred until homogenous in that seaweed colloid.

Thereafter, the mixture is cooked, and 12.5 g of sorbitol, and then casted, dried, and released from the mold. The bioplastic sheet is cut into certain size, then attached one to another by heating at 60-130 deg. C. The obtained bioplastic is 0.07-0.24 mm thick.

Example 4: Producing Edible Bioplastic from Seaweed as Coffee Sachet

As much as 60 g of *Eucheuma* sp. seaweed and 10 g of dry *Turbinaria* seaweed are soaked in 3 L of water for 10 min-24 h, then rinsed by clean water, drained, chopped, and added with water at pH 8.0, until the homogenous colloid is obtained. In the second container, a suspension of 5 g of sweet potato flour, 2.5 g of corn flour, 1.5 g of glycerin, and 20 g of sorbitol, is made thereof. Later, the homogenous starch suspension and 1 g of color are added to the seaweed colloid and stirred until homogen. This colloid is then casted, cut into certain size, attached one to another by heating at 100-130° C. The obtained bioplastic is 0.07-0.24 mm thick.

Example 5: Producing Edible Bioplastic from Seaweed as the Biomaterial for Paper Straw As much as 30 g of *Gracilaria* seaweed and 35 g of dry *Turbinaria* seaweed are cleaned with clean water and the attached foreign matter are removed, then the seaweed is chopped and extracted with 2 L of water with pH=8.5-9.5 so the homogenous colloid is obtained. Then, 3 g of glutinous rice flour and 20 g of gluten flour are cooked to become gel. After cooking process has finished, 10 g of glycerin, 1 g of flavor, and 1 g of color are added and stirred until homogenous. This final mixture is continuously loaded to hot belt conveyor with speed 6 m per hour so that at the end of the belt, the bioplastic is dry and roll-able. This roll could be cut into narrow roll with the width 1.5-2.0 cm and it can be used as raw material to make paper straw. The straw could be made manually by solid or hollow cylinder with diameter is the inner diameter of the straw. To release the straw from the cylinder, vegetable oil, margarine, or lecithin or the mixture thereof. If the straw is made by machine, three rolls are unrolled to get the long band, then they are passed through liquid glue and rolled to the metals as the core. At certain length, the straw is removed from the core and cut.

Example 6: Producing of Bioplastic Resin Using Spray Drying

The mixture of colloid from at least two natural biopolymers as disclosed in Example 1-5 is mixed with 0.02% (w/v) of maltodextrin, then stirred until homogenous. The tubing of spray drier is immersed into the mixture. The flow rate, diameter of nozzle, inlet and outlet temperatures are adjusted to obtain the bioplastic resin as fine powder or granular.

Example 7. Bioplastic Composting Process

The bioplastic from Example 1-6 is composted under anaerobic condition by burying the bioplastic at 15 cm under compost surface. The biodegradation of bioplastic is done by bacteria and fungi from various genus, depending on the microbial abundance in the compost and the temperature of environment.

The invention claimed is:
1. A biodegradable and edible bioplastic for packaging from natural and renewable polymers, comprising of:
   a seaweed selected from a group consisting of *Eucheuma* sp, *Sargassum* sp, *Turbinaria*, *Gracilaria* and a combination thereof, wherein the amount of the seaweed ranges from 10-60% by weight;
   at least one of a tuber, a protein isolate and a sap, wherein:
   the tuber is selected from a group consisting of potato, cassava, and sweet potato, wherein upper limit of the amount of the tuber is 15% by weight;

the protein isolate is selected from a group consisting of soy and gluten, wherein upper limit of the amount of the protein isolate is 20% by weight;

the sap is selected from a group consisting of rubber, copal, dammar, jelutong and combination thereof, wherein upper limit of the amount of the sap is 5% by weight; and one or more additives selected from a group consisting of glycerin, sorbitol, PEG, food flavor, and food color, wherein the amount of the additives ranges from 1-20% by weight, wherein the thickness of the bioplastic ranges from 0.07 mm to 0.24 mm.

2. A method of producing biodegradable and edible bioplastic for packaging from natural and renewable polymers, the method comprising:

mixing (i) a seaweed ranging from 10-60% by weight, (ii) at least one of a tuber, a protein isolate and a sap, wherein:

the upper limit of the amount of the tuber is 15% by weight;

the upper limit of the amount of the protein isolate is 20% by weight; and the upper limit of the amount of the sap is 5% by weight; and (iii) one or more additives ranging from 1-20% by weight to form a colloid;

homogenizing the colloid with or without adding water to obtain the bioplastic;

heating the bioplastic at 60-130 deg. C. to reduce the water content to 11-13% by weight;

casting the bioplastic in a mold as desired and further drying the mold; and releasing the bioplastic from the mold to obtain desired bioplastic.

* * * * *